UNITED STATES PATENT OFFICE.

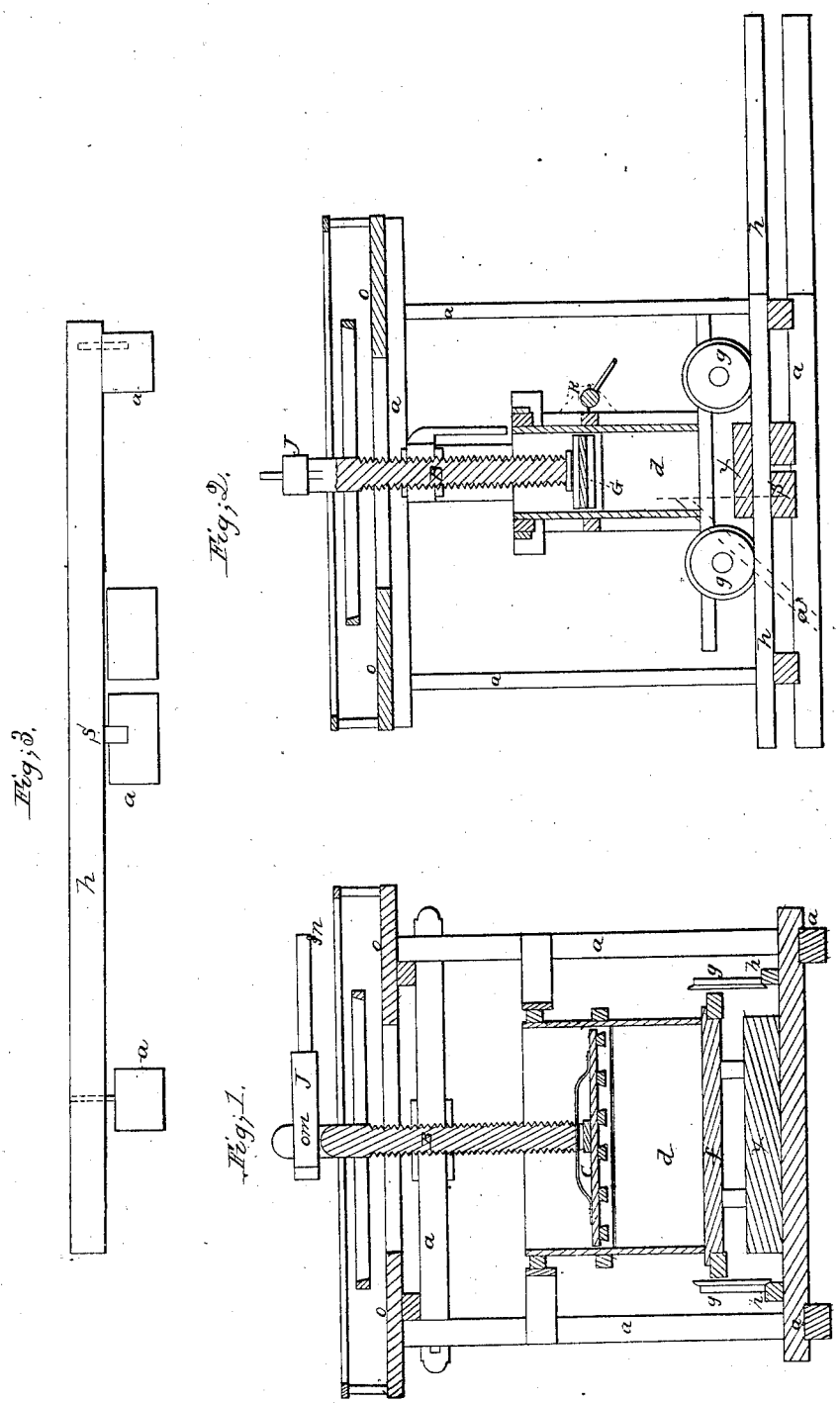

ALDEN ADAMS, OF JERSEYVILLE, ILLINOIS.

IMPROVEMENT IN HAY AND COTTON PRESSES.

Specification forming part of Letters Patent No. 11,986, dated November 28, 1854.

*To all whom it may concern:*

Be it known that I, ALDEN ADAMS, of Jerseyville, in the county of Jersey, and State of Illinois, have invented a new and useful Improvement in Cotton and Hay Presses; and I do hereby declare that the following is a full and exact description thereof, reference being had to the accompanying drawings, and to the letters and figures of reference marked thereon.

Similar letters are made to refer to corresponding parts, and the drawings considered part of this specification.

The nature of my improvement consist in several portions of the press which can be made more intelligible by referring directly to the drawings, of which—

Figures 1 and 2 are sectional elevations of the press at right angles with each other—that is, Fig. 1 is a sectional elevation of the complete press parallel with the length of the press-box, while Fig. 2 is a sectional elevation transversely through the press-box. Fig. 3 represents a separate view of one of the railways on which the press-box is run, it being mounted (the press-box) on wheels and axles, for purposes hereinafter specified.

The following is the portion of the specification which refers direct to the drawings. The drawings will be specified collectively.

$a\ a\ a$ represent the general frame-work of the machine, and B the screw used for pressing the cotton or hay, as the case may be.

$d$ represents the press-box, and $c$ the piston attached to the lower part of the screw.

$f$ represents the bottom of the press-box. The box is mounted upon a pair of axles and wheels, $g\ g$, which are made to run on the railways $h\ h$. The top of the press is provided with a platform, $o\ o$, around which the horse walks, used for working the screw B.

J represents the lever, to which the horse is attached by the hook $n$. At its end this lever is attached to the screw by a pin, $m$, which admits of the lever having an up-and-down motion, for the purpose of allowing the screw to be elevated or lowered, and yet keep the end of the lever at a proper distance from the platform on which the horse walks.

R represents a roll provided with pins, and around which the cords are roped for drawing them around the cotton bale after being pressed. This roll is attached to the side of the machine and furnished with a crank, for the purpose of turning the roll by hand, or any other plan equivalent.

As before stated, the press-box $d$, Figs. 1 and 2, is mounted upon axles and wheels $g$, for the purpose of removing the frame under the press and taking out the pressed bale, and refilling the same with cotton for pressing; and when in the act of pressing, the press-box $d$ is brought down on a frame-work or block of wood, to free the axles from all strain, which is effected by making the rolls under the press, so as they will yield when the screw is put into operation, and the press box, after the pressure is accomplished, is elevated from the frame-work or block of wood, as the case may be, by an india-rubber spring placed under each rail, as is represented in Fig. 3 at $s$, and also in Fig. 2 at $s$. These springs are made sufficiently strong under each rail to elevate and free the press-box, so as it can be run out to one side on a railway provided for the purpose.

$h$ represents the railway at the right of Fig. 2.

I do not claim the general device of mounting the pressing-box upon a frame-work and rollers, in order that it may be run under the follower and be withdrawn upon rails; but What I do claim is—

The combination of the rails $h$, mounted upon india-rubber or its equivalent, with the block $x$, so that during the descent of the follower the rails will be easily depressed, and frame and rollers relieved of the pressure, which will be borne by the block, and during the rise of the follower the rails will also rise and lift the frame and pressure-box up from the block, ready to be wheeled away.

ALDEN ADAMS.

Witnesses:
MARTIN BENSON,
JOS. A. J. GOODLOE.